(12) United States Patent
Storm

(10) Patent No.: US 7,576,871 B2
(45) Date of Patent: Aug. 18, 2009

(54) APPARATUS AND METHOD FOR MEASURING VOLUMES

(76) Inventor: Thomas W. Storm, 1602 Augusta Way, Casselberry, FL (US) 32707

( * ) Notice: Subject to any disclaimer, the term of this patent is extended or adjusted under 35 U.S.C. 154(b) by 38 days.

(21) Appl. No.: 11/901,734

(22) Filed: Sep. 19, 2007

(65) Prior Publication Data

US 2008/0079955 A1 Apr. 3, 2008

Related U.S. Application Data

(66) Substitute for application No. 60/848,876, filed on Oct. 3, 2006.

(51) Int. Cl.
*G01B 11/22* (2006.01)
(52) U.S. Cl. .................. 356/627; 250/559.21
(58) Field of Classification Search ................ 356/627; 250/559.21; 33/1 V
See application file for complete search history.

(56) References Cited

U.S. PATENT DOCUMENTS

| | | | |
|---|---|---|---|
| 3,681,747 | A | 8/1972 | Walsh |
| 4,417,817 | A | 11/1983 | Bohme et al. |
| 4,773,029 | A | 9/1988 | Claesson et al. |
| 5,043,735 | A | 8/1991 | Mawhinney et al. |
| 5,161,313 | A | 11/1992 | Rijlaarsadam |
| 5,202,740 | A | 4/1993 | Kivits |
| 5,247,487 | A * | 9/1993 | Beliveau et al. ............... 367/99 |
| 5,274,271 | A | 12/1993 | McEwan |
| 5,422,861 | A | 6/1995 | Stringer et al. |
| 5,440,492 | A * | 8/1995 | Kozah et al. ................ 701/221 |
| 5,477,622 | A * | 12/1995 | Skalnik ....................... 33/781 |
| 5,528,517 | A * | 6/1996 | Loken ......................... 702/156 |
| 5,572,427 | A | 11/1996 | Link et al. |
| 5,661,561 | A | 8/1997 | Wurz et al. |
| 5,886,775 | A * | 3/1999 | Houser et al. ............... 356/4.01 |
| 6,427,354 | B1 * | 8/2002 | Vepsalainen ................ 33/554 |
| 6,683,694 | B2 * | 1/2004 | Cornil ......................... 356/627 |
| 2003/0086096 | A1 * | 5/2003 | Cornil ......................... 356/627 |

FOREIGN PATENT DOCUMENTS

| | | |
|---|---|---|
| JP | 0174722 | 10/1984 |
| JP | 0302106 | 12/1989 |

(Continued)

OTHER PUBLICATIONS

U.S. Appl. No. 12/151,982, filed May 12, 2008, Storm (CIP of this application).

(Continued)

*Primary Examiner*—Roy Punnoose
(74) *Attorney, Agent, or Firm*—Paul S. Rooy, PA

(57) ABSTRACT

An apparatus and method for measuring volumes. The apparatus includes a base having a central processing unit, a receiver and a dock; and a scanner having an inertial navigation system, a transmitter, a sensor, a reset control, and a trigger in communication with a microprocessor. An alternate embodiment scanner may include an exclude control, which instructs the central processing unit to exclude floor, ceiling, and walls from the volume calculation. The method of measuring volumes includes the steps of placing the scanner in the dock, actuating a reset control which establishes a reference point for the inertial navigation system, scanning objects, transmitting the data points scanned to the central processing unit, and calculating the volume of the object(s) scanned.

12 Claims, 4 Drawing Sheets

FOREIGN PATENT DOCUMENTS

WO  PCT/US2007/20805  9/2007

OTHER PUBLICATIONS

PCT/US07/20805, Sep. 18, 2008, International Search Report and Written Opinion pertaining to PCT application.

PCT/US2007/020805, Apr. 16, 2009, Notification Concerning Transmittal of International Preliminary Report.
PCT/US2007/020805, Apr. 7, 2009, International Preliminary Report on Patentability.
PCT/US2007/020805, Sep. 18, 2008, Written Opinion of the International Searching Authority.

* cited by examiner

APPARATUS AND METHOD FOR MEASURING VOLUMES

Claim for Priority: This utility patent application is based upon and claims the benefit of the earlier filing date of U.S. provisional patent application Ser. No. 60/848,876 filed Oct. 3, 2006 entitled Apparatus and Method for Measuring Volumes.

BACKGROUND OF THE INVENTION

1. Field of the Invention

This invention relates to measurement systems, and in particular to an Apparatus and Method for Measuring Volumes.

2. Background of the Invention

The problem of volume measurement of disparately shaped goods has long defied simple solution. Since the dawn of human history, volume measurement of differently shaped objects has been important for a number of reasons: to be able to estimate the space required to store the items, to transport the items, to package the items, etc. For example, early sailing vessels incorporated only limited storage space for provisions, so effective trip logistics planning demanded accurate volume estimates of provisions—the survival of the crew and passengers could depend on it!

In more recent history, precise cubic volume measurement is crucial in ocean and air freight containerization, railroad box car and railroad container loading, efficient storage, and over-the-road shipment of lots comprising odd-shaped items such as household goods.

In addition, from the expense perspective, since the cost charged to store or to transport items is frequently linked to the cubic volume of the goods, it can be very costly to the shipper or the storage facility owner to underestimate the volume of goods. Similarly, a shipper or bailor's ability to accurately estimate cubic volume of goods to be shipped or stored facilitates more accurate cost quotes and contributes to the orderliness of these markets, to the benefit of the economy as a whole.

Existing Designs and Methods

Currently, hand tools such as measuring tapes and yardsticks are used to measure the volume of disparately-shaped goods. To take one example, in the area of household goods volume measurement, the cubic volume of a refrigerator or stove may be fairly readily estimated using a measuring tape. Volume measurement of more complex shapes such as sofas, desk chairs, loveseats, dining room chairs, tables, etc., however, is not so easily accomplished.

Given these irregular shapes, visual estimation becomes necessary, with attendant inaccuracy. In fact, in the average household goods move, the cubic volume estimate at the quotation stage may contain errors as high as 10-20% or more. These erroneous estimates can contribute to the underutilization of shipping resources, which leads to wasted shipping space, increased costs, and wasted fuel. These disadvantages operate to the detriment of not only the shipping and storage industry, but to the detriment of society at large.

SUMMARY OF THE INVENTION

Accordingly, it is an object of the present invention to provide a volume measurement apparatus and method which will accurately measure the cubic volume of complex-shaped three dimensional objects. Design features allowing this object to be accomplished include a scanner in communication with a base having a central processing unit capable of calculating the volume of an object scanned by the scanner. Advantages associated with the accomplishment of this object include increased transportation and storage efficiency, along with the associated cost and transportation fuel savings.

It is another object of the present invention to provide a volume measurement apparatus and method which is small and easily transportable. Design features allowing this object to be accomplished include a hand-held scanner and compact base. Benefits associated with the accomplishment of this object include reduced collapsed size, along with the associated easier storage and transportation.

It is another object of this invention to provide a volume measurement apparatus and method which may be instructed to ignore walls, ceiling and floor in a its scanning. Design features enabling the accomplishment of this object include a scanner having an exclude control, actuation of which instructs the scanner not to include surfaces scanned while the exclude control is actuated (such as floors, walls and ceilings) in the scanned volume calculation. Advantages associated with the realization of this object include increased accuracy and ease of use.

It is still another object of this invention to provide a volume measurement apparatus and method which is easy to use. Design features allowing this object to be achieved include a hand-held scanner having simple controls in communication with a base. Benefits associated with reaching this objective include reduced operator training cost, and ease of use.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIGS. 1 and 2. Sheet two contains FIGS. 3 and 4. Sheet three contains FIGS. 5 and 6. Sheet four contains FIG. 7.

DETAILED DESCRIPTION OF THE PREFERRED EMBODIMENT

Figure 1:
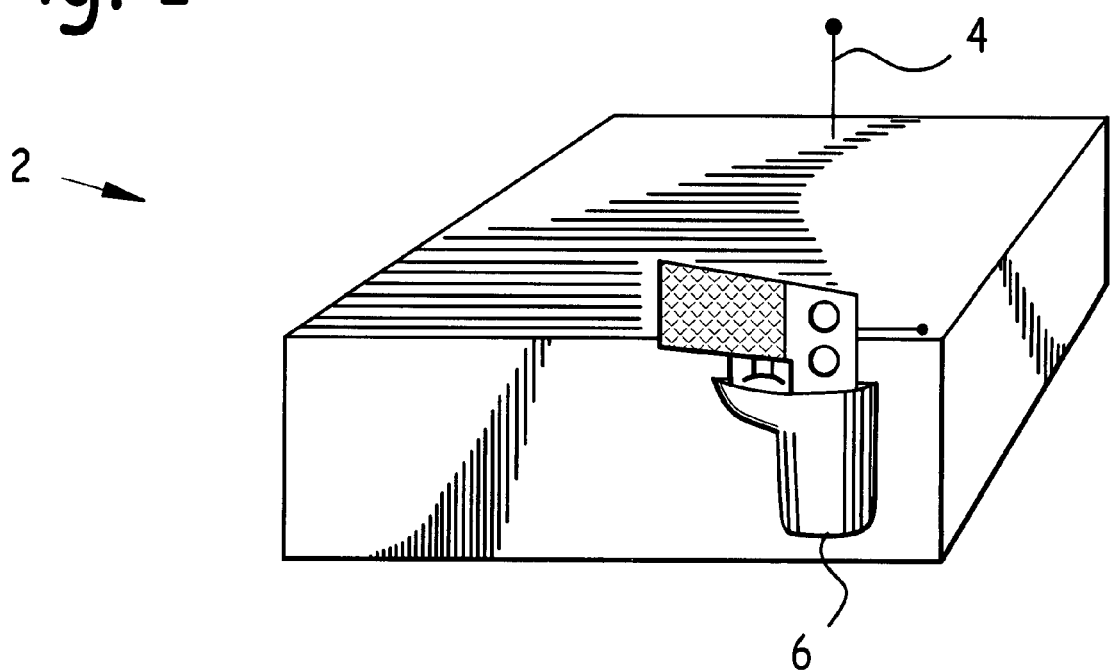
FIG. 1 is a front isometric view of a base station.
Figure 4:
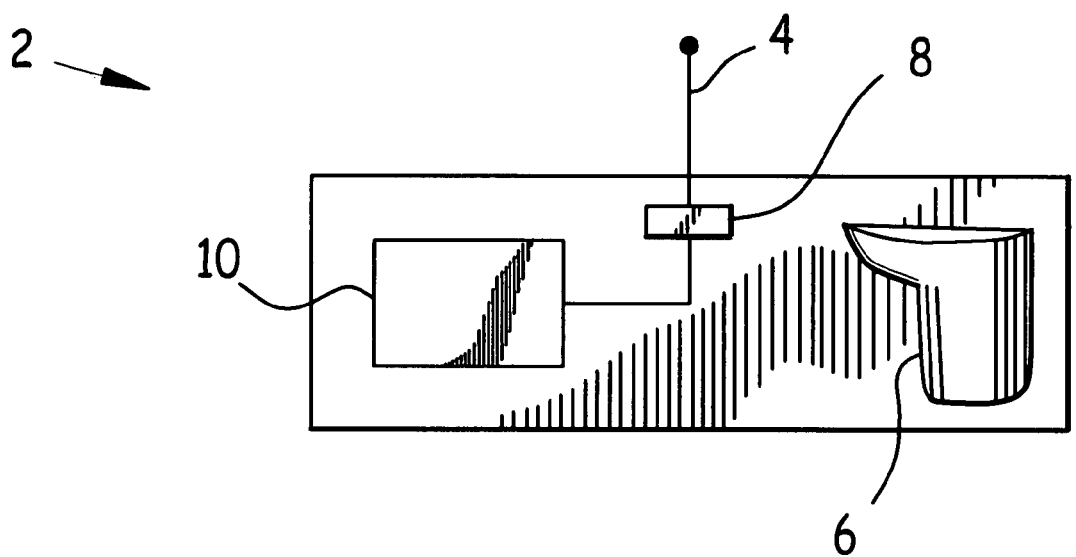
FIG. 4 is a front cross-sectional view of a base station.

FIG. 1 is a front isometric view of base station 2. FIG. 4 is a front cross-sectional view of base station 2. As may be observed in these two figures, base station 2 comprises CPU 10 (a central processing unit) electronically connected with receiver 8. Receiver 8 is connected with base antenna 4, which enhances reception of signals from scanner 20. Base station 2 also comprises dock 6, sized to admit scanner 20.

Figure 2:
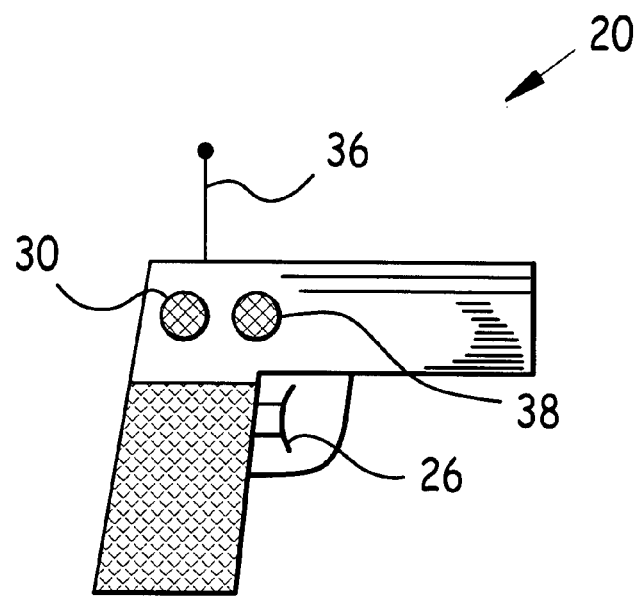
FIG. 2 is a front isometric view of a scanner.
Figure 3:
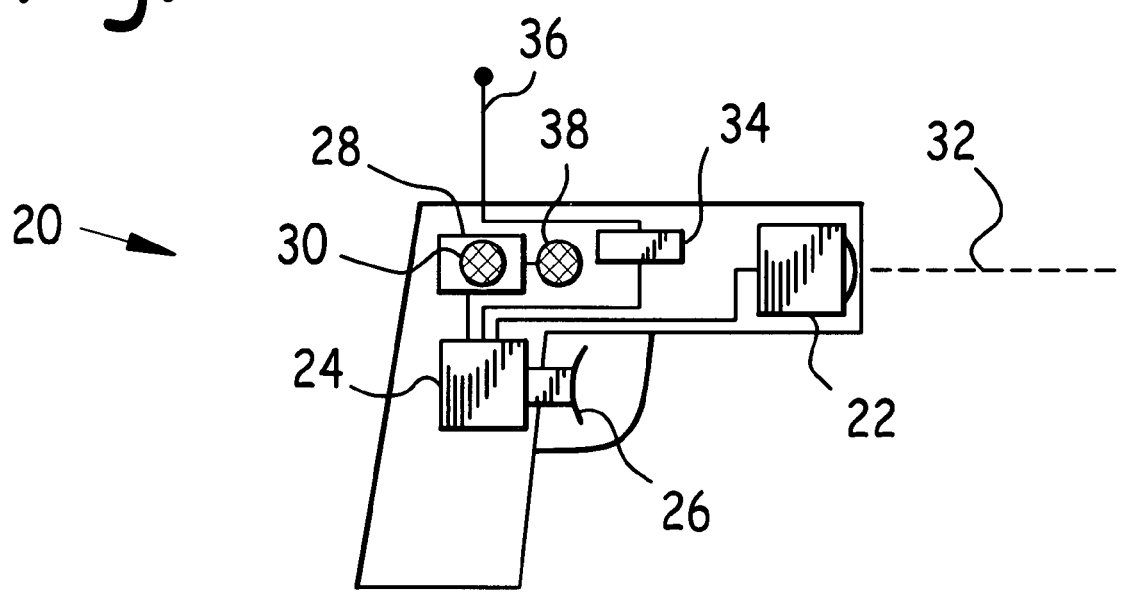
FIG. 3 is a front cross-sectional view of a scanner.

FIG. 2 is a front isometric view of scanner 20. FIG. 3 is a front cross-sectional view of scanner 20. Referring to these two figures, scanner 20 comprises microprocessor 24 electronically connected with trigger 26, sensor 22, transmitter 34, and INS 28 (an inertial navigation system). Actuation of trigger 26 has the effect of instructing scanner 22 to commence scanning volumes at which scanner 20 is aimed. Releasing trigger 26 has the effect of ceasing the scanning function.

When scanner 20 is docked with base 2 in dock 6, actuation of INS reset control 30 has the effect of establishing a reference point for INS 28, which may be the origin of a three-dimensional Cartesian coordinate system, or any other point, which may be completely arbitrary. If base station 2 is sitting on a flat surface such as the floor of a room whose contents are to be scanned, scanner 20 may be instructed to disregard anything scanned below a horizontal plane upon which base station 2 sits, thus avoiding including the volume of the floor of a room whose contents are to be scanned in the volume scanned.

Figure 5:
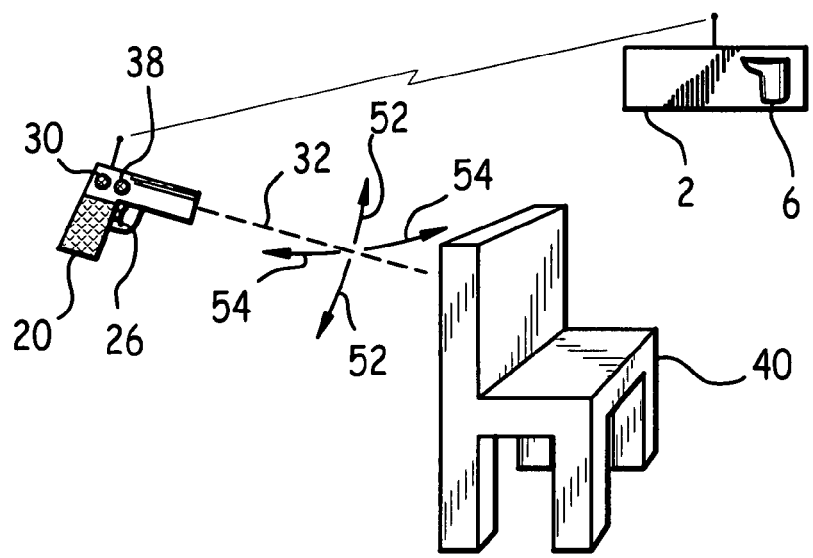
FIG. 5 is a front quarter isometric view of a chair whose volume is being scanned by a scanner in communication with a base station.
Figure 6:
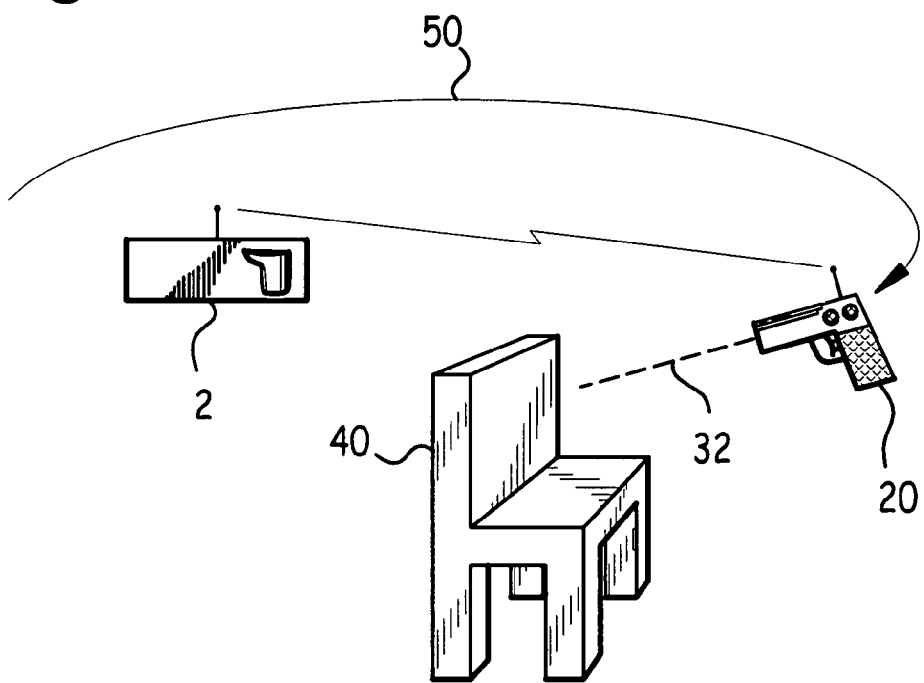
FIG. 6 is a front quarter isometric view of a chair whose volume is being scanned by a scanner in communication with a base station.

CPU 10 may be any digital or analog central processing unit which is capable of interpreting signals from sensor 22 and INS 28 in order to model an object being scanned, such as chair 40 in FIGS. 5 and 6. Software installed on CPU 10 permits the modeling function, based on the chair surface set of points in space scanned by scanner 20. A variety of such surface modeling programs are available as a sub-function of a number of commercially available three-dimensional drafting programs, and serve to produce a three-dimensional solid model of an object based on points or lines which have been inputted by a draftsperson.

In the instant invention, the collection of points in space is generated by sensor 22 and INS 28, translated into intelligible form by microprocessor 24, and communicated to CPU 10 by means of transmitter 34 having scanner antenna 36, and receiver 8 having base antenna 4.

Sensor 22 may be any appropriate sensor, including but not limited to a micro impulse radar (radar on a chip), LIDAR (laser illuminated direction and ranging or light detection and ranging), conventional radar, sonar, FLIR (forward looking infrared), X-ray, other infrared, etc. It is intended to fall within the scope of this disclosure that any sensor, and any CPU 10, may be employed. U.S. Pat. Nos. 5,663,498 and 5,739,426, both issued to Thomas W. Storm, are hereby incorporated hereinto in their entirety by reference, including all references incorporated into these patents by reference.

Microprocessor 24 may be any appropriate digital or analog microprocessor which is capable of sending signals to CPU 10 from INS 28 and sensor 22, such that CPU 10 may model an object being scanned by sensor 22. INS 28 is an inertial navigation system capable of establishing its position relative to base 2, and extrapolate any point scanned by sensor 22 by virtue of knowing its position in space relative to base 2 combined with which direction it is pointing. INS 28 may be any appropriate inertial navigation system, including but not limited to mechanical, electro-mechanical, fluid bearinged or flotation chambered systems, transformer coil systems, strapdown systems, laser, vibrating structure, hemispherical resonator, quartz rate, magnetohydromagnetic, pendular, accelerometer only, inertial navigation system on a chip, inertial guidance systems, or any other appropriate inertial navigation system.

Transmitter 34 and receiver 8 may be any appropriate communication system capable of communicating points-scanned data from scanner 20 to base 2, including but not limited to infrared, FM, AM, wireless digital, or any other appropriate communication system, including wires connecting scanner 20 to base 2.

FIGS. 5 and 6 are front quarter isometric views of a chair 40 whose volume is being scanned by scanner 20 in communication with base station 2. First scanner 20 is docked in scanner dock 6 on base 2, and INS reset control 30 actuated. This has the effect of establishing a reference point for INS 28, which may be the origin of a three-dimensional Cartesian coordinate system, or any other point, which may be completely arbitrary.

If base 2 is sitting on a flat surface such as the floor of a room whose contents are to be scanned, scanner 20 may be instructed to disregard anything scanned below a horizontal plane upon which base 2 sits, thus avoiding including the volume of the floor of a room whose contents are to be scanned in the volume scanned.

Next, scanner 20 is aimed at an object whose volume is to be scanned, as indicated in FIGS. 5 and 6. Trigger 26 is actuated to commence the scanning function via sensor beam 32, which will continue until trigger 26 is released.

Scanner 20 is moved to several different orientations relative to chair 40, so as to scan chair 40 from all angles, as indicated by arrow 50 in FIG. 6. This has the effect of discounting voids which may exist in the article being scanned, such as the voids between the legs of chair 40. In addition, scanner 20 may be scanned up and down as indicated by vertical arrows 52, as well as back and forth horizontally as indicated by horizontal arrows 54 in FIG. 5, in order to maximize the amount of data points scanned of chair 40 from each perspective.

Figure 7:
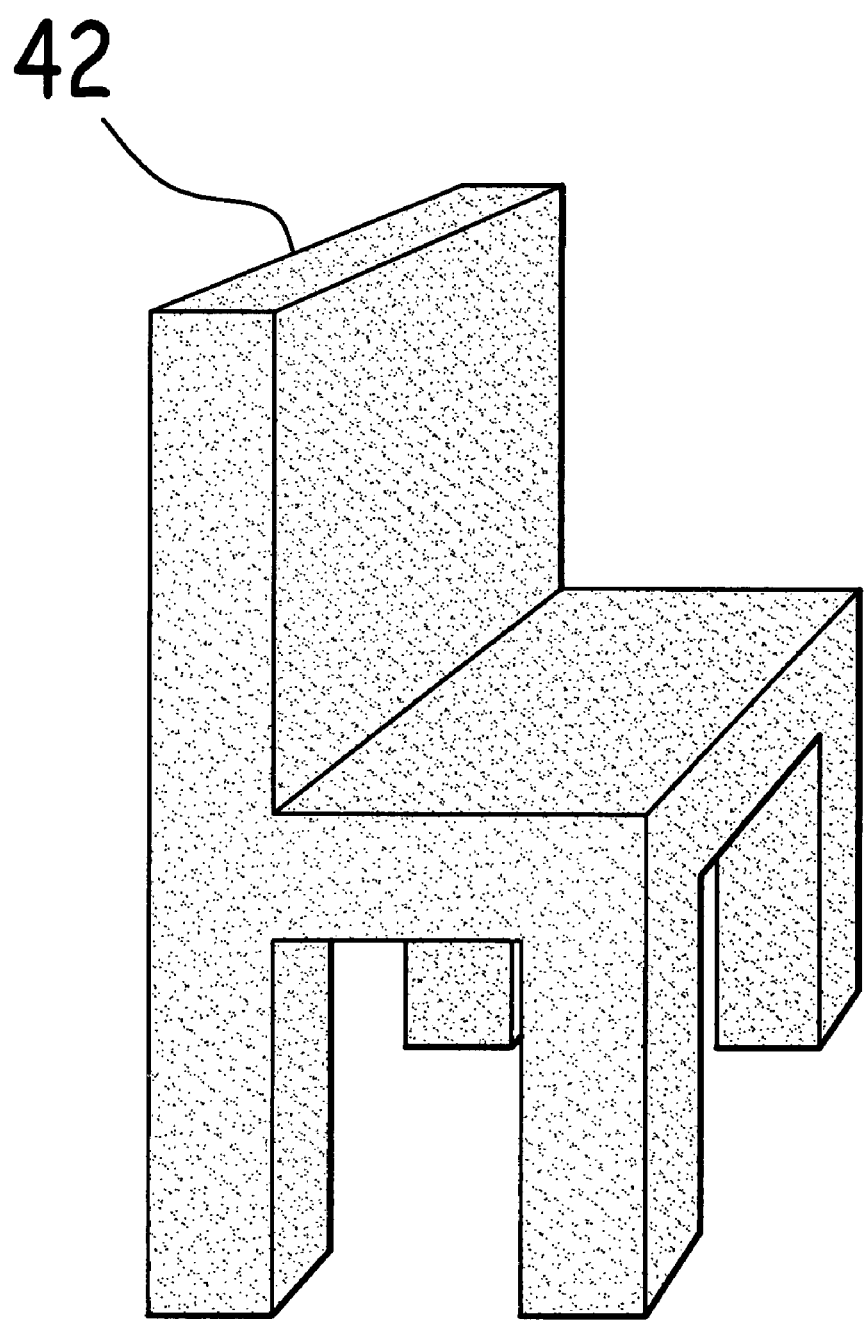
FIG. 7 is a front quarter isometric view of a model of a chair whose volume has been scanned by a scanner in communication with a base station, as modeled by a central processing unit in the base station based on scans of the chair from different perspectives.

CPU 10 assembles a model of all points scanned into a model as depicted by chair model 42 in FIG. 7. Of course, the more data points scanned, the more accurate the model. Chair 40 is made up of atoms and molecules, just like everything else which is "solid" in this world. If scanner 20 could scan each atom and molecule comprising chair 40, then the resulting model would be completely accurate. As a matter of practicality, if scanner 40 is capable of scanning up to several million data points per minute, the resulting model will be extremely accurate, as indicated in FIG. 7.

Next, CPU 10 calculates the volume of chair 40. Where the volume of an entire room-full (or house-full) of furniture is to be calculated, CPU 10 may maintain a running total of the room and/or house total. After the total volume of a lot of furniture has been scanned and calculated, the chore of quoting a price to move same becomes easy.

An alternate embodiment scanner 20 may include exclusion control 38. Actuation of exclusion control 38 and then scanning the floor and/or walls and/or ceiling of a room has the effect of instructing CPU 10 to not include these surfaces (or any volumes behind them) in the subsequent volume scan of object(s) resting on the floor or enclosed within the walls and/or ceiling of the room. Once exclusion control 38 is actuated and the floor, walls and/or ceiling of a room have been scanned, exclusion control 38 is de-actuated and a scan of the contents may be initiated.

Thus, the instant method of measuring volume comprises the steps of:

A. Placing scanner 20 in dock 6 on base 2 and actuating INS reset control 30;
B. Pointing scanner 20 at an object whose volume is to be scanned;
C. Actuating trigger 26;
D. Scanning said object with scanner 20;
E. Creating a model of said object using data points which have been scanned with scanner 20; and
E. Calculating a volume of said object.

The instant method of measuring volume may comprise the steps of placing said base station on a floor of a room containing said object, actuating said INS reset control while said base station is on said floor, and instructing said CPU to disregard anything scanned below the horizontal plane upon which said base station sits, thus avoiding inclusion of the volume of the floor of a room whose contents are to be scanned in the volume scanned.

The instant method of measuring volume may comprise the steps of scanning said object by sweeping said scanner vertically up and down said object, and/or scanning said object by sweeping said scanner horizontally back and forth across said object.

The instant method of measuring volume may comprise the steps of providing an exclusion control, actuating the exclusion control to instruct said CPU to not include surfaces scanned with the exclusion control actuated, and then de-actuating said exclusion control.

While a preferred embodiment of the invention has been illustrated herein, it is to be understood that changes and variations may be made by those skilled in the art without departing from the spirit of the appending claims.

DRAWING ITEM INDEX 2 base station
4 base antenna
6 dock
8 receiver
10 CPU
20 scanner
22 sensor
24 microprocessor
26 trigger
28 INS
30 INS reset control
32 sensor beam
34 transmitter
36 transmitter antenna
38 exclusion control
40 chair
42 model
50 arrow
52 vertical arrow
54 horizontal arrow

I claim:

1. An apparatus for measuring volumes comprising:
   a base comprising a dock, and a central processing unit in communication with a receiver;
   a scanner comprising a microprocessor in communication with a trigger, a sensor, a transmitter, and an inertial navigation system; said transmitter communicating with said receiver; said scanner being sized to fit into said dock; whereby actuation of said trigger instructs said scanner to commence scanning an object at which said scanner is aimed, and releasing said trigger instructs said scanner to cease said scanning.

2. The apparatus for measuring volumes of claim 1 wherein said scanner further comprises a reset control, whereby actuation of said reset control establishes a reference point for said inertial navigation system.

3. The apparatus for measuring volumes of claim 2 wherein said scanner further comprises an exclude control, whereby actuation of said exclude control instructs said central processing unit to not include surfaces scanned when said exclude control is actuated, and de-actuation of said exclude control resumes normal scanning.

4. The apparatus for measuring volumes of claim 3 wherein said base further comprises an antenna in communication with said receiver, and wherein said scanner further comprises an antenna in communication with said transmitter.

5. A method for measuring volumes comprising the steps of:
   A. Providing a base station comprising a dock, and a central processing unit in communication with a receiver;
   B. Providing a scanner comprising a microprocessor in communication with a trigger, a sensor, a transmitter, and an inertial navigation system; a reset control in communication with said inertial navigation system; said transmitter communicating with said receiver; said scanner being sized to fit into said dock; whereby actuation of said trigger instructs said scanner to commence scanning an object at which said scanner is aimed, and releasing trigger instructs said scanner to cease said scanning; and whereby actuation of said reset control establishes a reference point for said inertial navigation system;
   C. Placing said scanner in said dock on said base and actuating said inertial navigation system reset control;
   D. Pointing said scanner at said object whose volume is to be scanned;
   E. Actuating said trigger, whereby a scanning function of said scanner is initiated;
   F. Scanning data points on said object with said scanner;
   G. Transmitting said data points to said CPU;
   H. Said CPU creating a model of said object using data points which have been scanned with said scanner; and
   I. Said CPU calculating a volume of said object.

6. The method of measuring volumes of claim 5 comprising the further step of placing said base station on a floor of a room containing said object, actuating said reset control while said base station is on said floor, and instructing said central processing unit to disregard anything scanned below said floor upon which said base station sits, thus avoiding inclusion of a volume of said floor of a room whose contents are to be scanned, in a volume scanned.

7. The method of measuring volumes of claim 5 comprising the steps of scanning said object by sweeping said scanner vertically up and down said object, and/or scanning said object by sweeping said scanner horizontally back and forth across said object.

8. The method of measuring volumes of claim 5 comprising the steps of providing an exclusion control, actuating said exclusion control to instruct said central processing unit to not include surfaces scanned with said exclusion control actuated, and then de-actuating said exclusion control to resume normal scanning.

9. An apparatus for measuring volumes comprising:
   a base comprising a dock, and a central processing unit in communication with a receiver;
   a scanner comprising a microprocessor in communication with a trigger, a sensor, a transmitter, a reset control, and an inertial navigation system; said transmitter communicating with said receiver; and said scanner being sized to fit into said dock; whereby actuation of said trigger instructs said scanner to commence scanning an object at which said scanner is aimed and releasing said trigger instructs said scanner to cease said scanning.

10. The apparatus for measuring volumes of claim 9 wherein said scanner further comprises an exclude control, whereby actuation of said exclude control instructs said central processing unit to not include surfaces scanned when said exclude control is actuated, and de-actuation of said exclude control resumes normal scanning.

11. The apparatus for measuring volumes of claim 10 wherein said base further comprises an antenna in communication with said receiver, and wherein said scanner further comprises an antenna in communication with said transmitter.

12. In combination, the apparatus for measuring volumes of claim 9 and a floor, said base resting on said floor, and means for instructing said central processing unit to not include said floor in a volume being scanned.

* * * * *